United States Patent
Pike et al.

(10) Patent No.: US 9,648,389 B1
(45) Date of Patent: May 9, 2017

(54) IN-STREAM ASSOCIATION OF MEDIA CONTENT FOR VIDEO PRESENTATION

(71) Applicant: CITIZEN, INC., Portland, OR (US)

(72) Inventors: Sce Pike, Portland, OR (US); Matthew Motyka, Chicago, IL (US)

(73) Assignee: CITIZEN, INC., Portland, OR (US)

( * ) Notice: Subject to any disclaimer, the term of this patent is extended or adjusted under 35 U.S.C. 154(b) by 251 days.

(21) Appl. No.: 14/213,857

(22) Filed: Mar. 14, 2014

Related U.S. Application Data (60) Provisional application No. 61/781,528, filed on Mar. 14, 2013.

(51) Int. Cl.
*H04N 5/445* (2011.01)
*H04N 7/025* (2006.01)
*H04N 21/4725* (2011.01)
*H04N 21/431* (2011.01)

(52) U.S. Cl.
CPC ....... *H04N 21/4725* (2013.01); *H04N 21/431* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 2007/0282906 A1 | 12/2007 | Gabriel | |
| 2009/0006191 A1* | 1/2009 | Arankalle | G06Q 30/02 705/14.71 |
| 2009/0094520 A1* | 4/2009 | Kulas | G06F 17/30056 715/723 |
| 2009/0216805 A1* | 8/2009 | Coffman | G06F 17/30038 |
| 2010/0131389 A1* | 5/2010 | Steelberg | G06Q 30/0601 705/26.1 |
| 2012/0192222 A1* | 7/2012 | Kumar | G06Q 30/0251 725/32 |

* cited by examiner

*Primary Examiner* — Brian T Pendleton
*Assistant Examiner* — Dika C. Okeke
(74) *Attorney, Agent, or Firm* — Michael J. Andri (57) ABSTRACT

User-applied, in-stream association of media content with a video content item is disclosed. During presentation of a video content item, a user selects or otherwise identifies a media content item to be associated with the video content item. The user further selects or otherwise identifies a temporal position (e.g., time value) within the video content item with which the media content item is to be associated. In one example, a user selects and drags the media content item to or toward the video content item within a GUI to define the association. In at least some implementations, the video content item may be presented via a different device than the media content item, thereby forming a multi-platform association.

9 Claims, 4 Drawing Sheets

IN-STREAM ASSOCIATION OF MEDIA CONTENT FOR VIDEO PRESENTATION

CROSS REFERENCE TO RELATED APPLICATIONS

This application claims priority to U.S. Provisional Application Ser. No. 61/781,528, titled IN-STREAM ASSOCIATION OF MEDIA CONTENT FOR VIDEO PRESENTATION, filed Mar. 14, 2013, the entirety of which is hereby incorporated herein by reference.

BACKGROUND

Online publishers of multimedia content often support the tagging of their content by a community of users. Such tagging typically takes the form of user-applied text tags that serve to describe the content. Text tags enable users to locate multimedia content through the use of search engines or by manual inspection of the tags. Online publishers may also enable users to rate, comment upon, or otherwise indicate their preference with respect to published multimedia content. Ratings and commentary may be informative to users, and may provide an indication of the quantitative or qualitative value of the multimedia content as perceived by the community of users.

SUMMARY

User-applied, in-stream association of media content with a video content item is disclosed. In one example, a user may select or otherwise identify a media content item to be associated with a video content item that is presented to the user. The user may select or otherwise identify a temporal position (e.g., a time value) within the video content item with which the media content item is to be associated and/or a duration of time that the associated media content item is to be presented relative to the temporal position. Media content hosted by one or more third-party services may be associated with video content served by an unrelated video service.

During subsequent presentation of the video content item, the associated media content may be presented alongside or overlaying a video presentation region of a graphical user interface. An associated media content item may be presented and/or visually emphasized under select conditions, such as if the playback position of the video content item is within a threshold time proximity to the temporal position with which the media content item is associated. Links between users within a social networking environment may at least partially define which associated media content items are presented alongside or overlaid upon the video presentation region, or are emphasized relative to other associated media content items.

The association of media content with video content may span multiple device platforms. In at least some implementations, the video content item may be presented via a different device than the media content item, thereby forming a multi-platform association. For example, a video content item is presented via a first device. A user may associate a media content item with the video content item through manipulation of a graphical user interface presented at a second device. Users accessing instances of that video content item may be presented with the associated media content item, and may themselves associate other forms of media content with that video content item.

It will be appreciated that this Summary describes only some of the concepts covered in greater detail in the following Detailed Description and associated drawings. As such, claimed subject matter is not limited to the contents of this Summary.

DETAILED DESCRIPTION

As previously described with reference to the Summary, user-applied, in-stream association of media content with a video content item is disclosed. In one example, a user may select or otherwise identify a media content item to be associated with a video content item that is presented to the user. The user may select or otherwise identify a temporal position (e.g., a time value) within the video content item with which the media content item is to be associated. Media content hosted by one or more third-party services may be associated with video content served by an unrelated video service.

During subsequent presentation of the video content item, the associated media content may be presented alongside or overlaying a video presentation region of a graphical user interface. An associated media content item may be presented and/or visually emphasized under select conditions, such as if the playback position of the video content item is within a threshold time proximity to the temporal position with which the media content item is associated. Links between users within a social networking environment may at least partially define which associated media content items are presented alongside or overlaid upon the video presentation region, or are emphasized relative to other associated media content items.

The association of media content with video content may span multiple device platforms. In at least some implementations, the video content item may be presented via a different device than the media content item, thereby forming a multi-platform association. For example, a video content item is presented via a first device. A user may associate a media content item with the video content item through manipulation of a graphical user interface presented at a second device. Users accessing instances of that video content item may be presented with the associated media content item, and may themselves associate other forms of media content with that video content item.

Figure 1:
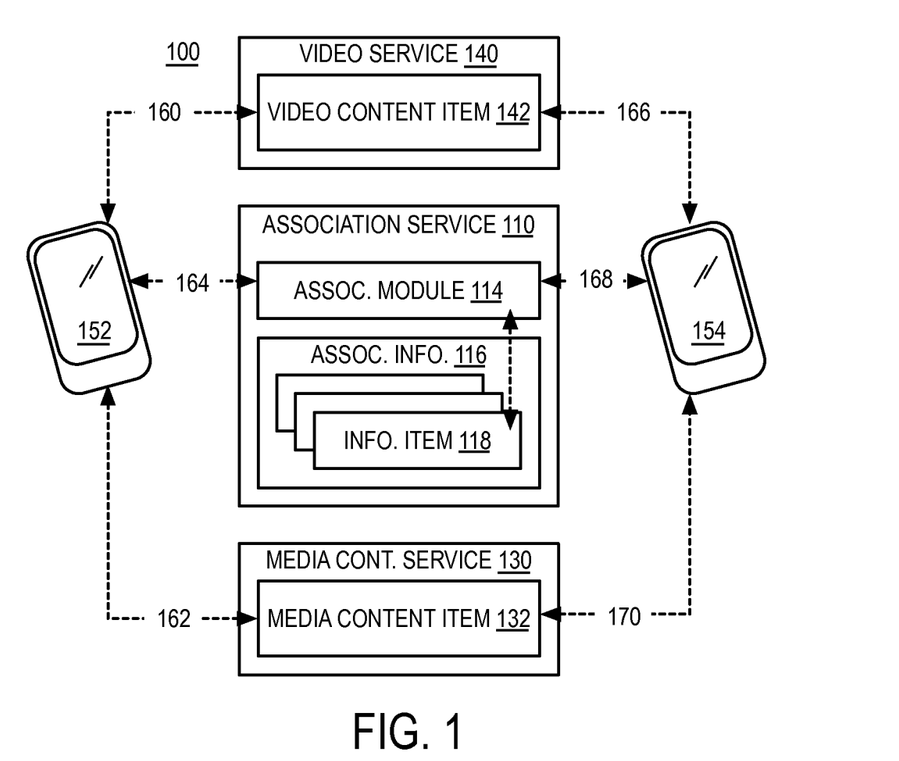
FIG. 1 is a schematic diagram depicting an example computing system.

FIG. 1 is a schematic diagram depicting an example computing system 100. Computing system 100 may include a variety of computing devices communicating over a wide-area communications network, such as the Internet and/or wireless access (e.g., cellular) networks, for example.

In one example, a client device 152 may access information over a communications network that has been made available to the client device by one or more services, such as a video service 140 that hosts video content, one or more media content services (e.g., media content service 130) that hosts one or more forms of media content, and an association service 110 that publishes association information linking video content of video service 140 and media content of one or more media content services (e.g., media content service 130). Services 110, 130, and 140 may each reside at and be hosted by one or more server devices of a server system. In one example, services 110, 130, and 140 may each reside at different respective server system and/or may be operated by different entities. In another example, some or all of services 110, 130, and 140 may reside at the same server system and/or may be operated by the same entity.

Figure 2:
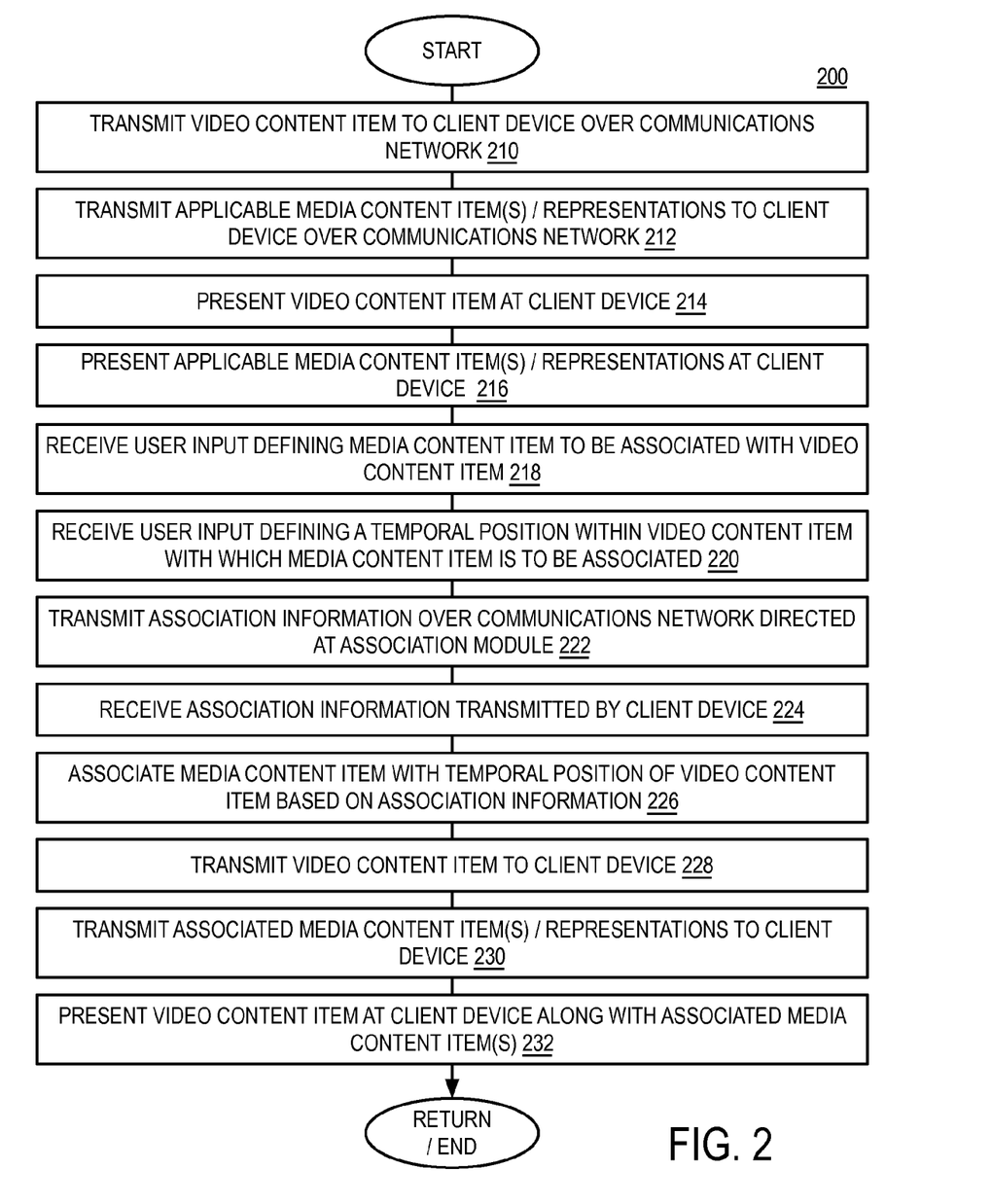
FIG. 2 is a flow diagram depicting an example method.

FIG. 2 is a flow diagram depicting an example method 200 in which media content may be associated with a video content item (e.g., video content item 142) by a first user (e.g., of client device 152), and the associated media content may be presented to a second user (e.g., of client device 154) during presentation of an instance of that video content item. As one example, method 200 may be performed by one or more computing devices of a computing system, such as computing system 100 of FIG. 1.

At 210, the method may include transmitting a video content item (e.g., video content item 142) to a client device (e.g., client device 152) over a communications network (e.g., as indicated at 160). The video content item may be requested by a user for presentation at a client device. Operation 210 may be performed by one or more servers hosting a video service, such as example video service 140. The video content item may be transmitted to the client device responsive to a request received from the client device. It will be understood that the video content item transmitted to the client device takes the form of an instance of the video content item residing at the video service.

Non-limiting examples of popular video services currently available to client devices over the Internet include YouTube™, Vimeo™, Hulu™, Amazon™, iTunes™, Xfinity™, etc. Video services may offer video content to client devices as downloadable video content and/or streaming video content. It will be understood that the video content and video content items discussed herein may include or may be accompanied by audio components corresponding to their respective video components.

Client devices may access and present video content to a user in a variety of ways. As one example, a client device may execute a browser program (e.g., a web browser) that is navigable to network resources (e.g., URLs) of one or more video services from which video content (and accompanying audio information, webpage content, etc.) may be downloaded or streamed. As another example, a client device may execute a video application program (e.g., video viewer) that loads video content from local data storage residing at the client device, or downloads or streams video content from a video service over a communications network. Video content loaded from local data storage may include video content captured or created by a user at the client device, such as via a camera of the client device. Client devices may access and present video content in other suitable ways and through other suitable application programs or operating systems without departing from the scope of the present disclosure.

At 212, the method may include transmitting one or more applicable media content items (e.g., media content item 132) and/or one or more representations of the applicable media content items to the client device (e.g., client device 152) over a communications network (e.g., as indicated at 162). In some examples, applicable media content may be selected by the video service, media content service, or third-party service based on attributes of the video content item. For example, metadata associated with the video content item (e.g., keywords within the video title and/or tags associated with the video content item, etc.) may be used by a network service to select (e.g., using automated algorithms) applicable media content items that accompany presentation of the video content item. It will be understood that applicable media content items may or may not be considered applicable to the video content item by all users. Rather the term "applicable" should be understood to include potentially applicable media content items or even inapplicable media content items depending on the user, and on the accuracy or precision of the selection process implemented by the network service. Applicable media content items and/or their representations that are transmitted to a client device may be transmitted by and/or reside at a variety of different network services.

Media content and individual media content items may include or take the form of textual tags, textual information (e.g., articles, books, blogs, etc.), images, video (including pre-recorded video and live-streaming video), presentation content such as charts, graphs, diagrams, schematics, etc., audio, ratings, commentary, indications of preference (e.g., thumbs up/down), bookmarks, websites, and other network resources, among other suitable forms of media content. In some examples, a media content item may be represented at a client device by a graphical representation (e.g., thumbnail, icon, text item, etc.) that provides a link (e.g., a hyperlink) to the media content item located at a remote network location or locally at the client device. Graphical representations of media content items may be presented at a client device, and a user of the client device may retrieve or otherwise access a media content item by selecting or otherwise directing a user input at its corresponding graphical representation. In such case, the client device may issue a request for and receive the media content item from the network location or the local storage location responsive to the user's input or selection prior to presenting that media content item at the client device.

Operation 212 may be performed by one or more server devices hosting one or more of a media content service (e.g., media service 130), the video service (e.g., video service 140) that transmitted the video content item to the client device at 210, and/or a third-party service (e.g., association service 110). In one example, the video content item transmitted to the client device at 214 may be accompanied by additional information that refers to one or more network locations where the one or more media content items and/or their representations reside. An application program responsible for presenting the video content item may interpret the additional information, and retrieve the media content items and/or their representations from one or more network locations. For example, a webpage may be transmitted to the client device that includes markup language (that may be interpreted by a browser program) having a referrer for the video content item, and one or more other referrers for applicable media content items and/or their representations. In at least some implementations, referrers for media content items and/or their representations may be generic or general placeholder referrers that refer to network locations and/or database entries of a network service (e.g., association service 110, search engine service, or other suitable service). This network service may respond to requests for the generic or general placeholder referrers with applicable media content items and/or their representations, or applicable referrers for such content, that have been selected by the network service on-behalf of the video service for that video content item.

Media content items and/or their representations may be requested and/or received by the client device over the communications network. For example, client device 152 receives one or more media content items (e.g., media content 132) or representations of the media content items from one or more media content services, such as media content service 130, as indicated at 162. Media content services may include social networking services, video content services, photo content services, music content services, news content services, or any suitable network resource, including virtually any form of online content.

At 214, the method may include presenting the video content item at the client device. As previously discussed, the presentation of video content may be performed by the client device executing a browser program or a video application program that presents video content via a graphical user interface. The client device displays the graphical user interface to a user via a display device. In at least some implementations, the video content item may take the form of a broadcasted video content item received at the client device from a video service. Broadcasted content may be distinguished from on-demand content in that the broadcasted content may be transmitted by a video service at a defined time (e.g., schedule programming) in which a plurality of client device and their respective users may view the broadcasted content. In another implementation, the video content may include an on demand content item. In still further implementations, the video content item may be created or captured at the client device via an on-board camera, and broadcasted or otherwise transmitted to one or more other computing devices for presentation to one or more other users. In this example, the operation at 210 may be omitted, and the method may further include the client device transmitting the video content created or captured at the client device to one or more other computing devices over a communications network.

Figure 3:
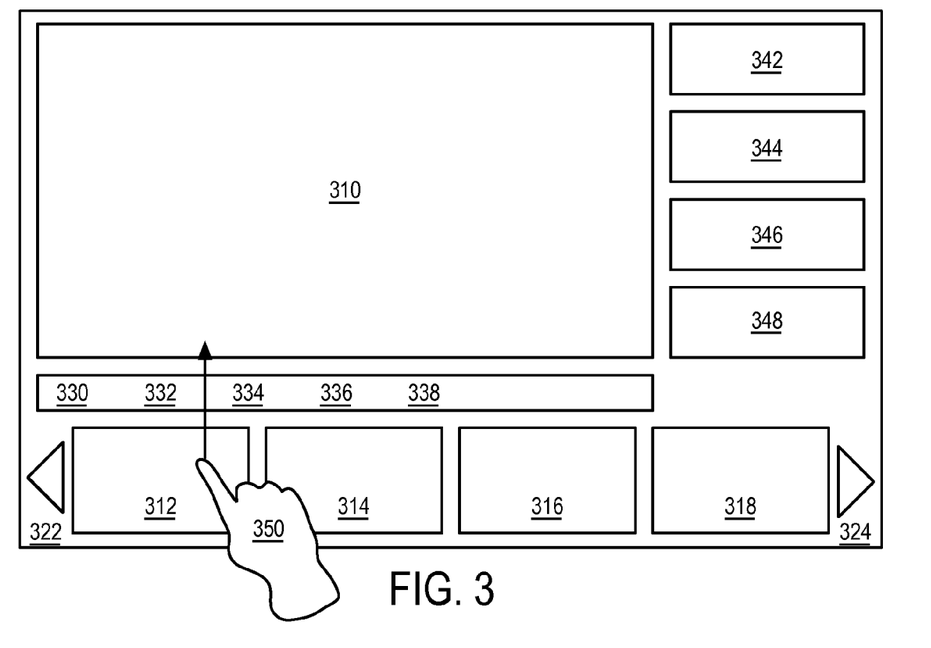
FIGS. 3 and 4 are schematic diagrams depicting example graphical user interfaces.

FIG. 3 depicts a non-limiting example of a graphical user interface (GUI) in which a video content item may be presented at a client device. The GUI includes a video presentation region 310 in which a video content item may be presented. During presentation of a video content item, a time counter indicating the playback position of the video content item may be presented within region 310 or at other suitable locations within the GUI.

The GUI may further include one or more control elements 342, 344, 346, 348, etc. One or more of these control elements may take the form of video playback controls, such as play, pause, fast-forward, rewind, seek, channel-up, channel-down (e.g., in the case of broadcast content), etc. One or more of these control elements may take the form of video recording and/or broadcasting controls that enable a user to capture video content via a camera located on-board or attached to a client device and to broadcast or transmit that video content to one or more other computing devices for presentation. One or more of the control elements may provide additional features, such as a schedule feature that allows a user to view a video content presentation schedule (e.g., in the case of broadcast content), or a chat feature that enables a user to direct text-based and/or real-time discussions to one or more other computing devices for presentation, as well as to receive those discussions from one or more computing devices. These discussions may relate to the video content that is presented via the GUI, and may form part of the media content that is associated with the video content item and a temporal position of the video content item at which the chat occurred. One or more of the control elements may enable a user to select the type or form of media content that is presented alongside or overlaying the video content. This media content may include media content that has been previously associated with the video content item by one or more users, a particular user, a pre-defined group of users (e.g., friends or other social linked group within a social network), and/or may include applicable media content that has been pre-selected for that video content item. Accordingly, control elements may enable a user to filter and/or adjust how and when applicable or associated media content items or their representations are presented to the user.

At 216, the method may include presenting the one or more media content items and/or one or more representations of the media content items at the client device. As previously discussed, presentation of media content items may be performed by the client device executing a browser program or a video application program that presents the media content and/or their representations via a GUI.

The GUI of FIG. 3 further depicts an example of media content and/or representations of media content presented at a client device. In this example, graphical elements 312-318 are depicted as icons or thumbnails that include or represent respective media content items, and graphical elements 330-338 that include or take the form of other media content items, such as text tags or textual commentary. It will be understood that these examples are non-limiting, as a GUI may present fewer or greater quantities of media content items and their representations.

Graphical elements 312-318 presented by the GUI may include or represent media content items associated with respective temporal positions or temporal ranges (e.g., a duration of presentation) of the video content item presented by the GUI. For example, in FIG. 3, graphical elements 312-318 may be arranged according to their temporal order with which they are associated with the video content item. In one example, graphical elements 312-318 may form a timeline in which time proceeds from left to right. In this example, a media content item formed or represented by graphical element 312 may be associated with the video content item presented at 310 at a temporal position of the video content item that precedes one or more of graphical elements 314, 316, 318, etc. However, in some scenarios, two or more graphical elements may include or represent media content items associated with the same temporal position or temporal range.

In at least some implementations, as playback of the video content item progresses, the graphical elements presented by the GUI may change responsive to the current playback position of the video content item to reveal media content items associated with the temporal position at or near the current playback position of the video content item. The GUI of FIG. 3 may include control elements 322 and/or 324 that enable the user to seek among a timeline of graphical elements forming the media content items or their representations without affecting the playback of the video content item. For example, as a video content item is playing within region 310, a user may seek forward or backward in the timeline formed from the graphical elements.

During presentation of video content at the client device, a user may associate various forms of media content with a video content item at specified temporal positions within the video stream. A temporal position may correspond to a time value (e.g., a time counter) within the video content item. For example, as video content item 142 is presented at client device 152, the user may associate a media content item (or cause the media content item to be associated) with the video content item at time value 2:12 (e.g., 2 minutes and 12 seconds) or other suitable time value representing a playback position of the video content item. Media content that has been associated with a video content item may be accessible to users of client devices distributed across the communications network during playback of an instance of that video content item.

The act of associating a media content item with a particular temporal position within a video stream may include the user selecting or otherwise indicating the media content item to be associated with the video content item, and selecting or otherwise indicating the temporal position with which the media content item is to be associated. The act of selecting a media content item, a video content item to be associated with the media content item, and a temporal position of the video content item with which the media content item is to be associated may include one or more user inputs.

Referring again to FIG. 2, at 218 and/or 220, the method may include receiving one or more user inputs indicating a media content item (which may be referred to as a target media content item) to be associated with the video content item and/or indicating a temporal position (which may be referred to as a target temporal position) within the video content item with which the media content item is to be associated. In at least some implementations, the one or more user inputs may further indicate a duration of time that the associated media content item is to be presented relative to the temporal position.

FIG. 3 depicts an example user input at 350. This user input may include a touch gesture in the case of a touch-sensitive graphical display or a pointer device-based operation (e.g., a mouse click). For example, a user may select graphical element 312 by touching (e.g., via a touch-screen interface) or navigating to (e.g., via a mouse) the graphical element, and may drag (as indicated in FIG. 3 by an arrow) or otherwise move the selected graphical element to or toward the presented video content item at 310. The temporal position within the video content item may be indicated by the instance in time within the video stream that the graphical element is selected and/or dragged to or toward the presented video content item. It will be understood that the operation of selecting and dragging a graphical element to associate media content with video content represents one of a variety of ways in which a user may indicate an intention to initiate a desired association. In other examples, the graphical element may be selected and dragged to or toward a different region of the GUI, or may provide indications for the association via one or more menu selections, or graphical elements (e.g., an 'associate' button).

In at least some implementations, a two-step approach (e.g., selecting and dragging) may be used to provide a way for the user to distinguish the act of viewing, browsing, or otherwise examining the media content item prior to committing to its association with the video content item. For example, media content items may be viewed or otherwise presented (e.g., audio may be output via an audio speaker) by a user directing a user input at graphical elements 312-318, such as by a touch-input or mouse-click on or at one or more of those graphical elements without the user dragging the graphical element. In such case, the client device may request the media content item from a network service responsive to that selection. While a two-step approach is described for associating media content items with a video content item at a defined temporal position, it will be understood that a single-step/input or a multi-step/multi-input approach may be used. Accordingly, in at least some examples, the user input received at 220 may form part of the user input received at 218, or may be omitted.

In still other examples, a user may associate a media content item with a video content item by manually typing text information (e.g., commentary, tags, or indicating a URL of the media content item) into a field of a graphical menu. Submission of the text information via the field may correspond to the temporal position at which the media content item is association with the video content item. As another example, a user may select a menu item or graphical element that enables a user to download one or more media content items from a network location to local storage and/or to select one or more media content items from local storage.

In at least some implementations, a user may associate a live-streaming video content item with the presented video content item (i.e., underlying video content item). In this case, a user may select a video capture tool via the user interface. The recording of live-streaming video content may indicate the temporal position with which the live-streaming video content is to be associated with the presented video content item. The duration of the associated live-streaming video content item may be defined by the user's selection to stop capturing video content. Live-streaming video content that is associated with the presented video content item may be transmitted from the client device to one or more network services in real-time, where it may be disseminated to other client devices during presentation of the underlying video content item.

Responsive to a user's association of media content with a video content item, at 222, the method may include transmitting association information over the communications network directed at an association service, such as example association service 110 of FIG. 1. Association service 110 may form part of video service 140 or media content service 130, or may be operated by the same entity that operates video service 140 or media content service 130. Alternatively, association service 110 may be operated by a third-party entity that is distinct from the operator of video service 140 and media content service 130. As one example, operation 222 may be performed by client device 152 as indicated at 164. Association information may include or otherwise indicate one or more of (1) an identity of the video content item, (2) an identity of the media content item to be associated with the video content item, (3) an indication of the temporal position within the video content item with which the media content item is to be associated and/or a duration of time for presentation of the media content item, and (4) an identity of the client device and/or the user defining the association. The association information may be obtained responsive to and/or based on the one or more user inputs received at operations 218 and 220.

At 224, the method may include receiving the association information originating at and transmitted by the client device at operation 222. The association information may be received over a communications network. While association information originates at and is transmitted by the client device, the association information may traverse one or more intermediate computing devices prior to be received at 224. As one example, these one or more intermediate computing devices may take the form of a home computing device (e.g., set-top box, mobile device, desktop computer, etc.) communicated over a LAN and/or these one or more intermediate computing devices may include one or more network servers hosting a paired reporting service or a third-party service. These intermediate computing devices may receive, process, and/or re-transmitted association information that is in-turn received at operation 224. Operation 224 may be performed by one or more server devices hosting the association service. The association service may include an association module 114 or other suitable instruction set for processing association information. In some implementations, the association information may be transmitted to and/or received by two or more independent entities. In such case, the association module may receive the association information from one or more of these independent entities.

In at least some implementations, a user may dissociate media content items from a video content item. For example, the user interface may include or present a menu or a graphical element that enables a user to indicate a dissociation command for a particular media content item (e.g., a "delete" or "dissociate" button). As another example, a user may drag an associated media content item away from the video presentation region, or away from a region containing associated media content items and/or toward a region containing dissociated or non-associated media content items. Dissociation of media content items may also be reported to a network service hosting an association module or other suitable network location to delete or otherwise break the relationship between the previously associated media content item and the video content item. In another implementation, if the video content item is a live-video stream originating from a client device, a user of the client device may select a menu item or graphical element that stops sharing associated media content items with other clients or users (e.g., a 'stop sharing' button).

At 226, the method may include associating the media content item with the video content item and/or the temporal position of the video content item based on the association information. Operation 226 may be performed by the association module. Associating the media content item with the video content item and/or the temporal position of the video content item may include storing the association information and/or information derived from the association information in a data store that may be later referenced or queried to obtain the associated information or portions thereof. The data store may reside at one or more servers of a video service, a media content service, or the association service. In FIG. 1, for example, association module 114 stores association information 116 that includes one or more information items 118 obtained from one or more sources, including information originating from client device 152. Association service 110 may maintain data records for numerous associations initiated by a client device user, for each of a plurality of client device users, and for each of a plurality of video content items of a video service.

Operations 210-226 may be performed for each of a plurality of client devices that view video content. In this way, a video content item may be associated with a variety of different media content items by a variety of different client devices and/or users of those client devices.

Association service and/or the association module of the association service may include or support one or more programming interfaces (e.g., APIs) that enable computing devices, such as client devices, video services and/or media content services to access association information. As one example, a computing device may send an API call to the association service that indicates a request for media content items associated with a particular video content item. As another example, an API call may indicate a particular user or client device, and may request association information attributed to that user or client device for a particular video content item, or for all video content items presented to that user. The association service may respond to the API call with the requested information, such as a list of media content items associated with the indicated video content item. Within a computing system, video content items, media content items, client devices, users, video service providers, and media content service providers may be assigned identifiers that enable such entities to be referenced and distinguished from each other.

Other users may operate their respective client devices to watch video content, including the video content item previously described with reference to operations 210-226. In some examples, a video content item may be watched by some or all of these users in real-time, such as in the case of broadcasted content. In other examples, the video content item may be watched by one or more users subsequent to being watched and/or created by the previously described user attributed to operations 210-226. Accordingly, media content that is associated with a video content item may be presented alongside a video content item in real-time or near real-time responsive to its association by a user, or at some later time of viewing.

At 228, the method may include transmitting the video content item (e.g., another instance of the video content item) to a client device (e.g., client device 154) over a communications network, as indicated at 166. In this example, client device 154 refers to a different client device from client device 152 that initiated association of a target media content item with the video content item. Client device 154 may be operated by a different user than client device 152, or may be operated by the same user. In other examples, client device 154 may be the same client device as client device 152, and may be operated by the same user or a different user.

As one example, operation 228 may be again performed by one or more servers hosting a video service, such as example video service 140. The video content item may be transmitted responsive to a request from the client device. The client device from to which the video content item is transmitted at 228 may be a different client device than the client device that previously caused media content to be associated with the video content item.

At 230, the method may include transmitting one or more associated media content items (e.g., another instance of the associated media content items) and/or one or more representations of the associated media content items (e.g., other instances of the representations) to the client device (e.g., client device 154), as indicated at 168 and/or 170. The one or more associated media content items and/or representations may be transmitted over a communications network. As one example, operation 230 may be performed by one or more server devices accessing association information (e.g., association information 116) for the video content item transmitted at 228. In some examples, the method at 230 may further include transmitting one or more applicable media content items and/or representations of the applicable media content items as previously described with reference to operation 216 to provide additional media content items that may be optionally associated with the video content item by that user.

At 232, the method may include presenting the video content item at the client device along with the one or more associated media content items and/or representations of the associated media content items.

Figure 4:
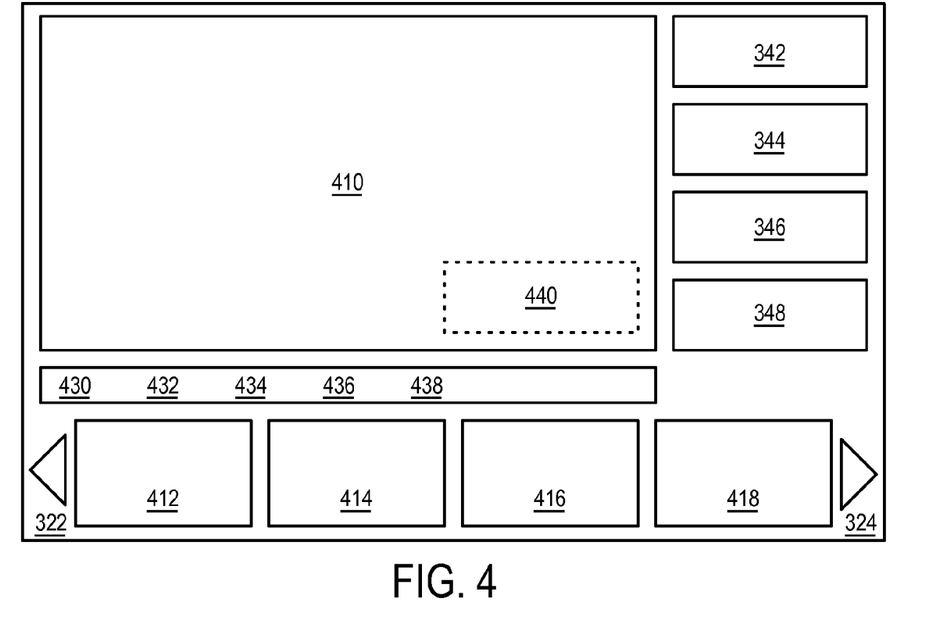

FIG. 4 depicts another non-limiting example of a graphical user interface (GUI) in which a video content item may be presented at a client device. The GUI of FIG. 4 includes some of the previously described control elements of FIG. 3, and may be presented at a client device that has requested a video content item that has been associated with media content. The GUI of FIG. 4 similarly includes graphical elements 412-418, and 430-438 forming or representing media content items. A video presentation region 410 may present the same video content item that was present in FIG. 3. However, one or more media content items or their representations presented by the GUI of FIG. 4 may differ from FIG. 3 due to one or more factors, including: (1) the presentation of the video content item being at a different temporal position than in FIG. 3, (2) the client devices and/or users are different in FIGS. 3 and 4, (3) one or more media content items have been associated with the video content item by the user in FIG. 3 prior to the video content item being presented to the user in FIG. 4.

For example, a media content item formed or represented by graphical element 312 that was associated with the video content item in FIG. 3 may be presented in the GUI of FIG. 4 alongside presentation region 410 as graphical element 412. As another example, the media content item formed or represented by graphical element 312 may be presented in the GUI of FIG. 4 overlaying at least a portion of presentation region 410 as graphical element 440. In at least some implementations, a menu or graphical element may be selectable by a user to 'favorite' or 'bookmark' an associated media content item that enables the user to later view or otherwise reference the associated media content item independent of presentation of the video content item. In another implementation, a menu or graphical element may be selectable by a user to 'share' associated media content items with other users or clients via SMS/MMS, email, social network, etc. It will be understood that the favorite, bookmark, and/or share functionality described herein may involve the client device transmitting information to one or more network services supporting the functionality.

Associated media content items may be presented and/or visually emphasized under select conditions, such as if the playback position of the video content item is within a threshold time proximity to the temporal position with which the media content item is associated. Links between users within a social networking environment may at least partially define which associated media content items are presented alongside or overlaid upon the video presentation region, or are emphasized relative to other associated media content items. For example, a user that requests a video content item may be presented with media content items that have been associated with the friends of that user within the social networking environment, or the associated media content items may be emphasized in relation to other associated media content items.

Associated media content items and/or their representations may be presented beginning at or near the temporal position for a duration of time. The duration of time may take the form of a default duration (e.g., 5 seconds, 10 seconds, etc.) for static content, may be defined by the user that associated the media content item with the video content item, or may be at least partially defined by the duration of the associated media content item for dynamic content such as video. In further examples, the duration of time that an associated media content item is presented may be based, at least in part, on the quantity and/or time proximity of other associated media content items. For example, if a video content item is associated with many media content items at or around a particular temporal position, then the duration of time for presentation of the associated media content item may be shorter than if the video content item is associated with fewer media content items at or around the temporal position.

Figure 5:
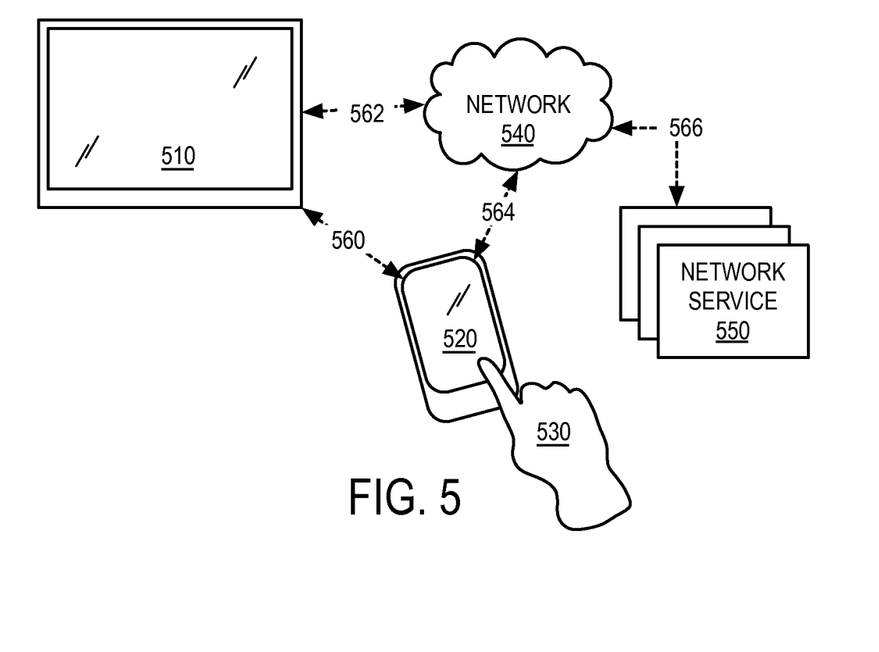
FIG. 5 is a schematic diagram depicting an example use-scenario in which a video content item presented at a first device is associated with a media content item through user interaction with a second device.

The previously described techniques of FIGS. 1-4 included the presentation of video content and media content via the same client device. However, these techniques may be distributed across two or more devices or platforms in some implementations. As one example, multi-platform association of media content with video content is described with reference to FIG. 5. FIG. 5 is a schematic diagram depicting an example use-scenario in which video content presented at a first device 510 is associated with media content item through user interaction with a second device 520. In at least some implementations, a user may initiate a device pairing operation to pair or otherwise associate two or more client devices, such as client device 510 and client device 520.

In one example, a user selects and drags (or flicks or pushes) the media content item toward or in the general direction of the first device within a GUI presented at the second device to define the association. The direction of the first device may be inferred or may be defined as the direction of the top of the GUI (e.g., in reference to text/graphical element orientation), since an individual user would typically view the two graphical displays at the same orientation at a given instance when the media content item is to be associated with the temporal position of the video content item. Alternatively or additionally, wireless signal strength of the first device may be detected by the second device over a personal area network (e.g., Bluetooth) alone or in combination with on-board inertial sensor measurements to obtain an estimate of the general direction of the first device. In another example, the user selects and drags the media content item to or toward an icon representative of the first device and/or video content item that is displayed via the GUI of the second device to invoke an association of the video and media content items.

First device 510 may form part of a device system that presents video content, such as a television, projector, computing device with a graphical display device, etc. The device system may further include a set-top box, computing device, gaming console, etc. that receives video content over a communications network and presents the video content via first device 510. For purposes of facilitating understanding of the disclosed subject matter, first device 510 will be described in terms of its computing components and/or devices of a device system being integrated with the graphical display components.

Second device 520 may take the form of a personal computing device, such as a tablet computer, smartphone, laptop computer, desktop computer, etc. with its own graphical display. The first and second devices may be entirely independent computing platforms in one example. First device 510 may present video content to a plurality of viewers, for example, within the context of a living room of a home residence. An individual viewer 530 of the video content presented at first device 510, and also as a user 530 of second device 520, may select a media content item or its representation presented at second device 520 that is to be associated with a video content item presented at first device 510.

Association information may be obtained from the example use-scenario of FIG. 5 using a variety of techniques. In one example, information may be communicated between the first device (and/or device system) and the second device via a personal area network or a local area network as indicated at 560. As another example, information may be communicated between the first device (and/or device system) and the second device via one or more intermediate network devices over a wide area communications network, as indicated at 562 and 564. Alternatively or additionally to the communications depicted in these examples, information may be communicated from first and/or second devices to a server system hosting a network service 550 via a wide area communications network 540, as indicated at 566. First and second device 510 and 520 (and/or the device system) may communicate wirelessly and/or over wired links with each other or with network 540. As one example, second device 520 may take the form of a wireless device, and first device 510 (and/or the device system) may take the form of a wired device.

In one example, a user of second device 520 may manually indicate the identity of the video content item (e.g., check-in or other suitable indication) being viewed by the user at the first device 510, which can be communicated to network service 550 using any of the previously described communications paths. In another example, the identity of the video content item may be inferred by network service 550 based on a proximity detected between devices 510 and 520, in combination with knowledge by the network service of the video content item being served to first device 510 (and/or device system) by the network service itself or by a video service. Responsive to an indication of the video content item being presented at first device 510, a network service may transmit media content items and/or their representations to second device 520, including applicable media content items and/or previously associated media content items.

Using any of the previously described techniques, association information may be obtained by a network service, stored, and disseminated in a manner that enables other viewers/users to experience associated media content items. Network service 550 or other network services depicted in FIG. 5 may include the previously described association service, video service, and/or media content services.

The presentation of associated media content items along with a video content item may also span multiple devices. Referring again to FIG. 5, a user may pair a personal computing device (e.g., client device 520) with client device 510. A video content item downloaded or streamed over network 540 for presentation at client device 510 (e.g., via path 562) may be accompanied by the delivery of associated media content items to paired client device 520 over network 540 (e.g., via path 564 or paths 562 and 560). The associated media content items may be presented to user 530 at client device 520 at appropriate times throughout presentation of the video content item at client device 510.

In at least some implementations, communication path 562 may take the form of a wired or wireless communication link with network 540, while communication path 564 may take the form of a different wireless communication link with network 540. Communication paths 562 and 564 may access network 540 via the same or via different network gateways. For example, communication path 562 may access network 540 via a gateway operated by a cable television service provider and communication path 564 may access network 540 via a gateway operated by cellular network service provider. However, in another example, communication paths 564 and 562 may access network 540 via a common gateway or device, such as via an on-premises wireless router.

In an example use-scenario, a user spontaneously decides to incorporate supplemental media. For example, a teacher is lecturing in a virtual classroom to a group of remote students via a live video stream. The teacher poses a question, and one of the students answers correctly. The teacher then rewards the individual student-viewer (or, if teacher chooses, the entire class) with a humorous video clip incorporated into the live stream (e.g., overlaying or presented alongside the presentation region of the live video stream).

It will be understood that the disclosed communications may be transmitted over and received via one or more communications networks, including local area networks, wide area networks, personal area networks (e.g., peer to peer networks), or combinations of such networks. Within the context of the present disclosure, video content items, application media content items/representations thereof, association information, and/or associated media content items/representations thereof, may be transmitted by and/or received by a computing device via one, two, or more different communications networks. As a non-limiting example, a client computing device may receive and/or transmit some or all of these example communications to/from another client device via a local area network and/or personal area network for subsequent processing and/or re-transmission/forwarding to a third computing device (e.g., a server device) over a wide area network, and the client device may alternatively or additionally receive and/or transmit other portions of these example communications to/from the third computing device over a different communications network such as a wide area network. Furthermore, it will be appreciated that communications directed to a target recipient computing device that are transmitted over a communications network may traverse one or more intermediate computing devices that may receive, optionally process, and forward some or all of the received communications or processed forms thereof to the target recipient computing device.

In at least some implementations or use-scenarios, the communication of resources in the form of video content items, applicable media content items or their representations, associated media content items or their representations, etc. may be achieved by communicating one or more corresponding resource identifiers (URLs or other suitable forms of a resource identifier) to the target receipt computing device, which in turn may be used by that recipient computing device to request the resource(s) indicated by those resource identifiers from a third-party computing device, such as network servers or server systems that are operated by (1) the same entity that originated the URL transmission and/or (2) one or more unrelated or unaffiliated entities. It will be appreciated that a general purpose browser or a special-purpose browser operating at a client device may be used to request and retrieve resources from any suitable network location using resource identifiers.

Figure 6:
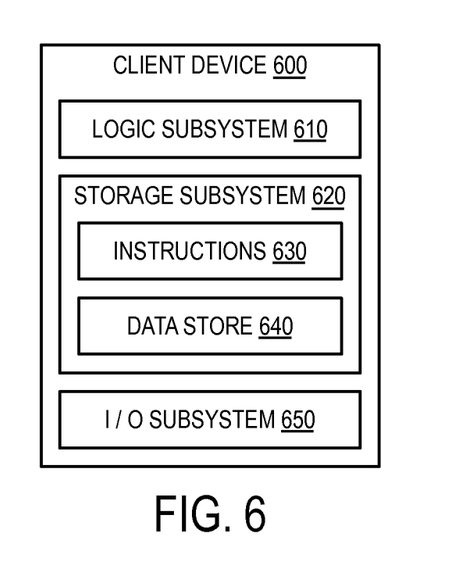
FIG. 6 is a schematic diagram depicting an example computing device.

FIG. 6 is a schematic diagram depicting an example computing device 600. Computing device 600 may take the form of the any of the previously described computing devices, including client and server devices (or server systems formed by a plurality of servers), for example. Computing device 600 includes a logic subsystem 610 that may execute instructions 630 held in a storage subsystem 620. Logic subsystem 610 may include one or more processor devices and/or other suitable logic devices and associated electronic circuitry. Hence, it will be understood that logic subsystem 610 includes hardware.

Instructions 630 may be executable by logic subsystem 610 to perform one or more of the various methods, operations, or processes described herein. Instructions 630 may include software and/or firmware, and may include one or more of the various modules described herein. Instructions may take the form of one or more of an operating system, an application program, a software portion (e.g., a plug-in, an update, markup, etc.), or other suitable instruction set. Storage subsystem 620 may include one or more memory devices, hard drives, and/or removable storage devices, etc. Storage subsystem 620 may further include a data store 640 within which the various forms of information, data, content items, data associations, etc. may be stored. Hence, it will be understood that storage subsystem 620 includes hardware.

Computing device 600 may include an input/output subsystem 650. Input/output subsystem 650 may include or otherwise interface with one or more input/output devices and/or communications network interfaces. Examples of input devices include a touch-screen display, a pointing device such as a mouse or a controller, a microphone, an optical sensor, an inertial sensor, etc. Examples of output devices include a graphical display (including a touchscreen display), an audio speaker, a haptic feedback device, etc. Input/output subsystem 650 may support communications over one or more wired and/or wireless communications networks using any suitable communication protocol or set of communication protocols.

The GUIs described herein may be defined and/or rendered using instructions that take the form of an operating system and/or one or more application programs, and may be defined and/or rendered using instructions obtained over a communications network, including markup language, for example. In some examples, an application program executed at a client device may be paired with or specifically configured for use with the association module of the remotely accessible association service described herein.

It should be understood that the disclosed embodiments are illustrative and not restrictive. Variations to the disclosed embodiments that fall within the metes and bounds of the claims or equivalence of such metes and bounds are intended to be embraced by the claims, now or later presented.

The invention claimed is:

1. A method performed by a computing system, the method comprising:
   transmitting an instance of a video content item to a first client device over a communications network for presentation at the first client device;
   selecting multiple applicable media content items for the video content item based on attributes of the video content item, the attributes including metadata of the video content item;
   transmitting an instance of the multiple applicable media content items for the video content item and/or one or more representations of the multiple applicable media content items to the first client device over the communications network for presentation at the first client device alongside or overlaying presentation of the video content item;
   receiving association information over the communications network, the association information originating at and transmitted by the first client device responsive to the first client device receiving one or more user inputs indicating a target media content item of the multiple applicable media content items to be associated with the video content item and further indicating a temporal position within the video content item with which the target media content item is to be associated, wherein the one or more user inputs include a selection of the target media content item within a graphical user interface and a dragging or flicking of the target media content item within the graphical user interface toward the video content item presented within the graphical user interface to define an association between the target media content item and the video content item, and the temporal position of the video content item with which the target media content item is to be associated;
   associating the target media content item with the video content item and the temporal position of the video content item in a data store based on the association information received over the communications network, the association information including or otherwise indicating the temporal position within the video content item with which the target media content item is to be associated;
   transmitting another instance of the video content item to a second client device over the communications network for presentation at the second client device; and
   transmitting another instance of one or more associated media content items for the video content item including the associated target media content item and/or one or more representations of the one or more associated media content items to the second client device over the communications network for presentation at the second client device alongside or overlaying presentation of the video content item at the temporal position within the video content item.

2. The method of claim 1, wherein the association information includes or otherwise indicates an identity of the video content item.

3. The method of claim 1, wherein the association information includes or otherwise indicates an identity of the target media content item to be associated with the video content item.

4. The method of claim 1, wherein the association information further includes or otherwise further indicates a duration of time for presentation of the target media content item in relation to the temporal position.

5. The method of claim 1, wherein the association information includes or otherwise indicates an identity of the first client device and/or a first user of the first client device defining the association.

6. The method of claim 1, wherein the multiple applicable media content items include one or more textual tags, textual articles, images, video items, audio items, rating items, commentary items, bookmarks, websites, and/or network resources; and
   wherein the one or more representations of the multiple applicable media content items include one or more graphical thumbnail images, icons, text items, and/or hyperlinks.

7. The method of claim 1, further comprising: transmitting an instance of the video content item to a third client device over the communications network for presentation at the third client device;
   transmitting an instance of the multiple applicable media content items for the video content item and/or the one or more representations of the multiple applicable media content items to the third client device over the communications network for presentation at the third client device alongside or overlaying presentation of the video content item;
   receiving additional association information over the communications network, the additional association information originating at and transmitted by the third client device responsive to the third client device receiving one or more user inputs indicating an additional target media content item of the multiple applicable media content items to be associated with the video content item and indicating an additional temporal position within the video content item with which the additional target media content item is to be associated; and associating the additional target media content item with the video content item and the additional temporal position of the video content item in the data store based on the additional association information received over the communications network;

wherein the one or more associated media content items and/or the one or more representations of the one or more associated media content items transmitted to the second client device further includes the additional associated target media content item and/or a representation of the additional associated media content item for presentation at the second client device alongside or overlaying presentation of the video content item at the temporal positions within the video content item.

8. The method of claim 1, further comprising:

receiving additional association information over the communications network, the additional association information originating at and transmitted by the second client device responsive to the second client device receiving one or more user inputs indicating an additional target media content item of the multiple applicable media content items to be associated with the video content item and/or indicating an additional temporal position within the video content item with which the additional target media content item is to be associated;

associating the additional target media content item with the video content item and the additional temporal position of the video content item in the data store based on the additional association information received over the communications network;

transmitting yet another instance of the video content item to a third client device over the communications network for presentation at the third client device; and transmitting yet another instance of one or more associated media content items for the video content item including the associated target media content item and the additional associated media content item, and/or one or more representations of the one or more associated media content items to the third client device over the communications network for presentation at the third client device alongside or overlaying presentation of the video content item at the temporal positions within the video content item.

9. A computing system including one or more computing devices, the computing system comprising: a logic subsystem to execute instructions; and a data storage subsystem having instructions stored thereon executable the logic subsystem to:

select multiple applicable media content items for a video content item based on attributes of the video content item, the attributes including metadata of the video content item;

transmit the multiple applicable media content items for the video content item and/or one or more representations of the multiple applicable media content items to a first client device over a communications network for presentation at the first client device alongside or overlaying presentation of the video content item;

receive association information over the communications network, the association information originating at and transmitted by the first client device responsive to the first client device receiving one or more user inputs indicating a target media content item of the multiple applicable media content items to be associated with the video content item and indicating a temporal position within the video content item with which the target media content item is to be associated, wherein the one or more user inputs include a selection of the target media content item within a graphical user interface and a dragging or flicking of the target media content item within the graphical user interface toward the video content item presented within the graphical user interface to define an association between the target media content item and the video content item, and the temporal position of the video content item with which the target media content item is to be associated;

associate the target media content item with the video content item and the temporal position of the video content item based on the association information received over the communications network, the association information including or otherwise indicating the temporal position within the video content item with which the target media content item is to be associated; and transmit one or more associated media content items and/or one or more representations of the associated media content items to the second client device over a communications network for presentation at the second client device alongside or overlaying presentation of the video content item at the temporal position within the video content item.

* * * * *